United States Patent
Langenohl

(10) Patent No.: US 6,190,448 B1
(45) Date of Patent: Feb. 20, 2001

(54) NON-SLUMPING, PUMPABLE CASTABLE HIGH PURITY SILICA COMPOSITION

(75) Inventor: Mark C. Langenohl, Pittsburgh, PA (US)

(73) Assignee: Harbison-Walker Refractories Company, Pittsburgh, PA (US)

( * ) Notice: Under 35 U.S.C. 154(b), the term of this patent shall be extended for 0 days.

(21) Appl. No.: 09/246,473

(22) Filed: Feb. 9, 1999

(51) Int. Cl.⁷ .................. C04B 28/26; C09D 1/02
(52) U.S. Cl. .................. 106/600; 106/287.1; 106/287.34; 501/95.1; 501/123; 501/133; 501/154
(58) Field of Search .................. 106/600, 287.34, 106/287.1; 501/95.1, 123, 133, 154

(56) References Cited

U.S. PATENT DOCUMENTS

| | | | |
|---|---|---|---|
| 4,227,932 | * 10/1980 | Leah et al. | 106/630 |
| 4,780,142 | * 10/1988 | Rechter | 106/600 |
| 4,906,297 | * 3/1990 | Breen | 106/600 |
| 4,921,536 | * 5/1990 | Rechter | 106/600 |
| 5,494,267 | 2/1996 | Anderson et al. | 266/281 |
| 5,512,325 | 4/1996 | Langenohl et al. | 427/421 |
| 5,549,745 | 8/1996 | Langenohl et al. | 106/692 |

FOREIGN PATENT DOCUMENTS

94/14721 * 7/1994 (WO).

* cited by examiner

Primary Examiner—Anthony Green
(74) Attorney, Agent, or Firm—Craig G. Cochenour

(57) ABSTRACT

A refractory composition is disclosed comprising a high purity silicon dioxide and a binder. This refractory composition may be applied by trowelling, brushing, casting, pumping and/or spraying it on a worn and/or damaged high purity silica refractory surface. A refractory castable composition is also disclosed that may be employed with forms. Further, an essentially non-slumping, sprayable refractory castable composition that is applied without the use of forms is provided. The sprayable refractory castable composition comprises (a) a tempered, pumpable first component comprising (i) a high purity silicon dioxide and a binder, and (ii) water, if needed, to achieve a pumpable consistency, and (b) a second component comprising a flocculating agent. The flocculating agent is added to the first component for achieving installation of the sprayable refractory composition in an amount to prevent slumping of the sprayable refractory castable composition.

15 Claims, No Drawings

NON-SLUMPING, PUMPABLE CASTABLE HIGH PURITY SILICA COMPOSITION

BACKGROUND OF THE INVENTION

1. Field of Invention

This invention relates to a high purity, silicon dioxide (silica) refractory composition, castable composition and spray mix. The high purity silica refractory composition comprises from about 50.0 weight percent to 99.9 weight percent silicon dioxide and from about 0.1 weight percent to 30.0 weight percent of a binder. This invention also relates to a high purity silica refractory castable composition comprising the high purity silica refractory composition of the instant invention and water in an amount sufficient to achieve a castable composition consistency for casting the refractory castable composition with the use of forms.

Further, the present invention relates to an essentially non-slumping, pumpable and sprayable high purity silica refractory castable composition that may be applied without the use of forms comprising a tempered, pumpable first component comprising the refractory castable composition of the instant invention as disclosed herein, and a second component comprising at least one flocculating agent that is added to the first component at the time of installation of the sprayable high purity silica refractory castable composition in an amount to prevent slumping. A method of applying the essentially non-slumping, sprayable high purity silica refractory castable composition without the utilization of forms is provided.

2. Brief Description of the Background Art

U.S. Pat. Nos. 5,549,745 (Langenohl et al.) and 5,512,325 (Langenohl et al.) disclose a non-slumping, high density, low moisture sprayable refractory castable composition containing calcium aluminate cement. Thus, it will be appreciated by those persons skilled in the art that the use of low moisture, non-slumping, high density, and calcium aluminate cement containing refractory compositions that may be applied with and without forms are well-known.

It is well known that refractory bricks having a high silica content are employed to line the walls and surfaces of high temperature furnaces such as for example the furnaces used in glass tanks for the manufacture of glass and in coke ovens. Repair of worn silica refractory brick in high temperature furnaces has, up to the time of this invention, been limited to the replacement of the worn silica refractory brick from the wall or surface of the furnace, for example. The replacement of the worn silica refractory brick entails physically removing the worn silica refractory brick from the wall or surface and inserting a new silica refractory brick in place of the removed worn silica refractory brick. This procedure of replacing a worn high silica content refractory brick(s) with a new high silica content refractory brick(s) is very expensive due to the labor to replace the worn silica brick, the amount of time that the furnace is out of service and operation while being repaired, and the material costs. A monolithic refractory composition, therefore, is needed to repair a worn high purity silica refractory brick, and thus, eliminating the need to physically remove the worn high purity silica refractory brick from the surface of, for example a furnace wall, or glass tank crown.

Conventional and well known silica monolithic compositions and method(s) of applying the same are employed in lining various metallurgical vessels.

For example, U.S. Pat. No. 5,494,267 ('267 Patent) discloses a pumpable refractory composition for manufacturing a refractory liner which is resistant to attack from slag comprising about 36 to 92 percent by weight silicon carbide, about 8 to 20 percent by weight of a binder which includes about 15 to 70 weight percent colloidal silica having an average particle diameter of 4 to 100 millimicrons, 0 to 10 percent by weight free carbon, and 0 to 50 percent by weight alumina. The refractory composition disclosed in the '267 Patent is cast into a liner shape with the use of forms and allowed to harden at room temperature. The '267 Patent states that the hardening takes from about fifteen minutes to five hours depending on the thickness of the desired refractory. The '267 Patent sets forth that the refractory composition preferably contains about ten to forty percent by weight of alumina and is preferably selected from brown fused alumina, white fused alumina, tabular alumina, and mixtures thereof U.S. Patent '267 states that the refractory composition preferably includes about 0.02 to 1.0 percent by weight of a setting agent such as calcium aluminate cement, magnesium oxide and mixtures thereof U.S. Patent '267 is unconcerned with providing a sprayable refractory composition that may be used without the use of forms. Further, U.S. Patent '267 is unconcerned with the particular unsolved problems that are encountered with high purity silica refractory brick in the volatile chemical environment of a glass-tank furnace.

While the above mentioned background art castable, refractory monolith compositions are known, they generally contain levels of calcium aluminate cement and alumina or contain low purity silica raw material that are unacceptable for use in replacing worn high purity silica refractory brick. The alumina content, low purity silica raw material, and combinations thereof, remain the weak links in employing known refractory castable monoliths to repair worn high purity silica refractory bricks in situ.

Therefore, in spite of this background material, there remains a very real and substantial need for a high purity silica refractory composition, and a castable composition, and a spray mix having a high purity silica refractory composition that may be employed for repairing worn high purity silica refractory bricks in situ.

SUMMARY OF THE INVENTION

The present invention has met the above-described needs. The present invention provides a refractory composition comprising from about 50.0 to 99.9 weight percent of a high purity silicon dioxide (ie. silica, SiO2), and from about 0.1 weight percent to 30.0 weight percent of a binder. The present invention further provides a refractory castable composition comprising the refractory composition of this invention as described herein and water present in an amount sufficient to achieve a castable consistency.

Another embodiment of this invention provides a method of using the refractory castable composition with forms or molds to produce a castable refractory product of a desired shape. This method provides for the manufacture of a castable refractory product comprising casting the refractory castable composition of the instant invention as described herein, to form a refractory shape or lining. The refractory castable composition of this invention may also be used to repair worn high purity silica refractory brick by casting it onto the cold face of the worn high purity silica refractory brick. Thus, the refractory composition of the instant invention may be used to patch a worn high purity silica refractory brick, such as may be encountered in a glass-tank furnace.

In another embodiment of this invention, an essentially, non-slumping, sprayable high purity silica refractory castable composition is provided that is applied without forms. This sprayable refractory castable composition of the present invention comprises (a) a tempered, pumpable first component comprising (i) 100 weight percent of a refractory composition wherein the refractory composition comprises from about 50.0 weight percent to 99.9 weight percent of a high purity silicon dioxide, and from about 0.1 weight percent to 30.0 weight percent of a binder, and (ii) from about zero (0) weight percent to thirty (30) weight percent water based upon 100 weight percent of the refractory composition wherein the water is present in an amount sufficient to achieve a pumpable consistency of the tempered first component; and (b) a second component comprising a flocculating agent, wherein the second component is added to the first component for achieving installation of the sprayable refractory castable composition in an amount to prevent slumping.

Another embodiment of this invention provides a method of applying the essentially, non-slumping, sprayable high purity silica refractory castable compositions of the instant invention, as described herein, on a surface without the use of forms, with a pump means and an associated hose means and an associated nozzle means comprising (a) preparing the tempered pumpable first component of the instant invention as disclosed herein, achieve a pumpable consistency of the first component to enable the first component to be pumped and applied through the pump means, the hose means and the nozzle means, (b) adding a second component comprising a flocculating agent to the first component to form a sprayable refractory castable composition, wherein the flocculating agent is added to the first component at or just prior to the time of the application of the sprayable refractory castable composition through the nozzle means, (c) introducing air through the nozzle means just prior to the time of the application of the sprayable refractory castable composition and (d) applying the sprayable refractory castable composition to the surface without the use of forms.

DETAILED DESCRIPTION

The present invention provides a refractory composition comprising from about 50.0 weight percent to 99.9 weight percent of a high purity silicon dioxide, and from about 0.1 weight percent to 30.0 weight percent of a binder.

Another embodiment of the instant invention provides a refractory castable composition comprising (a) one hundred (100) weight percent of a refractory composition comprising from about 50.0 weight percent to 99.9 weight percent of a high purity silicon dioxide, and from about 0.1 weight percent to 30.0 weight percent of a binder, and (b) from about zero (0) weight percent to thirty (30) weight percent water based upon one hundred weight percent of the refractory composition, wherein the water is present in an effective amount sufficient to achieve a castable consistency.

As used herein, the term "effective amount" refers to that amount of a substance necessary to bring about a desired result, such as, for example, the amount of a substance, such as, for example water, needed to achieve a consistency suitable for installing the refractory castable composition of the present invention, such as, for example but not limited to, troweling, brushing, casting, pumping, spraying and combinations thereof, on a surface, wherein the surface may be vertical, horizontal, and/or overhead.

As used herein, the terms "high purity silicon dioxide" and "high purity silica" means that the silicon dioxide (silica) grain has a content of at least 90 weight percent silicon dioxide and preferably at least 98 weight percent silicon dioxide.

Further, it is preferable to use a mixture of various grain sizes of the high purity silicon dioxide grain in the refractory composition of the instant invention. Table I, infra, sets forth an example of ranges of various mesh sizes that can be utilized. All mesh sizes referred to in Table I are Tyler standard mesh sizes well known to those persons skilled in the art.

The high purity silicon dioxide used in instant invention comprises at least one of an amorphous silica, crystalline silica, fumed silica, flint, quartz, and combinations thereof. The amorphous silica aggregate can be fused silica or vitreous silica, and combinations thereof The crystalline silica may be, for example, in powder or granular form, and includes for example, quartz sand, and/or ground quartz.

The binder used in the instant invention can be any binder suitable for use with silica refractories. Such as for example, the binder is a silica based material, such as for example, but not limited to a colloidal silica, an alkali silicate, and combinations thereof Preferably, the alkali silicate is potassium silicate.

The amount of water used in the refractory castable composition of the instant invention is the effective amount needed to achieve a castable consistency of the constituent components of the base mix (i.e. high purity silicon dioxide and binder) of the refractory castable composition such as, for example, from about zero (0) weight percent to 30 weight percent water for each 100 weight percent of the constituent components of the base mix of the refractory castable composition. More preferably, from about 10.0 weight percent to 15.0 weight percent water for each 100 weight percent of the constituent components of the base mix of the refractory castable is employed to attain the highest possible strength of the resulting refractory castable while also ensuring proper flow during casting.

In yet another embodiment of the instant invention, the refractory castable composition further comprises from about 0.1 weight percent to 1.0 weight percent of at least one fiber based upon one hundred (100) weight percent of the refractory composition. The fiber may be any fibrous material known by those persons skilled in the art compatible with silica refractory castable compositions, such as, for facilitating the removal of moisture upon heating. The fibrous material is, for example, but not limited to, vinyl acetate fiber, vinyl chloride fiber, polypropylene fiber, and combinations thereof Another embodiment of the instant invention provides the refractory composition, as described herein, further comprising from about 0.1 weight percent to five (5) weight percent calcium carbonate.

Another embodiment of the present invention provides a method of using the refractory castable composition with forms or molds to produce a castable refractory product of a desired shape. This method provides for the manufacture of a castable refractory product comprising casting the refractory castable composition of the instant invention as described herein to form a refractory shape or lining.

In another embodiment of this invention, a method is provided wherein the high purity silica refractory composition of the instant invention may be installed into place on a surface requiring repair, such as for example, the surface of a glass-tank furnace, and more specifically, for example, a worn and/or damaged high purity silica refractory brick. The installation includes trowelling, brushing, casting, pumping and/or spraying the high purity silica refractory composition of the instant invention onto the surface. The surface may be such as for example, but not limited to, a vertical surface, a horizontal surface and/or an overhead surface.

In another embodiment of this invention, an essentially, non-slumping, sprayable high purity silica refractory castable composition is provided that is applied without forms. This sprayable refractory castable composition of the present invention comprises (a) a tempered, pumpable first component comprising (i) 100 weight percent of a refractory composition wherein the refractory composition comprises from about 50 weight percent to 99.9 weight percent of a high purity silicon dioxide and from about 0.1 weight percent to 30.0 weight percent of a binder, and (ii) from about zero (0) weight percent to 30 weight percent water based upon 100 weight percent of the refractory composition, wherein the water is present in an amount sufficient to achieve a pumpable consistency, and (b) a second component comprising a flocculating agent. The flocculating agent is added to the first component of the sprayable refractory castable composition at or just prior to the installation of the sprayable refractory castable composition to a surface without the use of forms. The flocculating agent is added to the first component in an amount to prevent slumping. Preferably, the amount of the flocculating agent added for each 100 weight percent of the first component castable solids is from about 0.1 weight percent to 5.0 (five) weight percent.

The flocculating agent used in the instant invention can be any suitable for silica refractory use. For example, but not limited to, the flocculating agent comprises at least one of the agents selected from the group of an alkali chloride, an alkaline-earth chloride, an alkali phosphate, a calcium hydroxide, and a calcium oxide. Preferably, the flocculating agent is a calcium hydroxide (hydrated lime) slurry. The calcium hydroxide slurry may be, for example but not limited to, a mixture of from about ninety (90) weight percent to fifty (50) weight percent water and from about ten (10) weight percent to fifty (50) weight percent hydrated lime.

Another embodiment of the present invention provides a method of applying the essentially, non-slumping, sprayable high purity silica refractory castable composition of the present invention, as described herein, on a surface without the use of forms, with a pump means and an associated hose means and an associated nozzle means comprising (a) preparing a tempered pumpable first component comprising (i) 100 weight percent of a refractory composition comprising from about 50.0 weight percent to 99.9 weight percent of a high purity silicon dioxide and from about 0.1 weight percent to 30.0 weight percent of a binder, and (ii) from about zero (0) weight percent to 30 weight percent water based upon 100 weight percent of the refractory composition, wherein the water is present in an amount sufficient to achieve a pumpable consistency of the first component to enable the first component to be pumped and applied through the pump means, the hose means and the nozzle means, (b) adding a second component comprising a flocculating agent to the first component to form a sprayable refractory castable composition, wherein the flocculating agent is added to the first component to form the sprayable refractory castable composition at or just prior to the time of application of the sprayable refractory castable composition, (c) introducing air through the nozzle means just prior to the time of the application of the sprayable refractory castable composition, and (d) applying the sprayable refractory castable composition to a surface without the use of forms. Preferably, the method of the instant invention as disclosed herein, comprises adding the flocculating agent to the first component through the nozzle means to form the sprayable refractory castable composition at the time of application of the sprayable refractory castable composition through the nozzle means.

Another embodiment of the method of the instant invention as disclosed herein further comprises employing the refractory composition of the instant invention as disclosed herein wherein the refractory composition further comprises from about 0.1 weight percent to five (5.0) weight percent (wt. %) calcium carbonate.

It will be understood by those persons skilled in the art that another embodiment of the method of the instant invention as disclosed herein further comprises adding at least one fiber, as disclosed herein, to the sprayable refractory castable composition.

EXAMPLES

The following examples demonstrate the instant invention in greater detail. These examples are not intended to limit the scope of the instant invention in any way. In the examples the following products were used:

"GP-lll Fused Silica Powder is a fused silica powder commercially available from CE Minerals, Valley Forge, Pa., USA.

"Elkem EMS-965" is a fimed silica powder commercially available from Elkem Materials, Pittsburgh, Pa., USA.

"Min-U-Sil" is a 5 micron high purity silicon dioxide powder commercially available from U. S. Silica, Berkeley Springs, W.Va., USA.

"Sil-Co-Sil 90" is a −200 mesh high purity silicon dioxide powder commercially available from U.S. Silica, Berkeley Springs, W.Va., USA.

"Kasil SS Powder" is a potassium silicate powder commercially available from PQ Corporation, Valley Forge, Pa., USA.

"Ludox 30 HS" is a colloidal silica liquid commercially available from DuPont deNemours Company, Wilmington, Del., USA.

"Herculon Type 153" fiber is a polypropylene non-woven staple fiber (Denier=3.0, length=5.0 millimeter) commercially available from Hercules Incorporated, Wilmington, Del., USA.

Examples 1 and 2

Examples 1 and 2 are high purity silica sprayable refractory castable compositions of the present invention.

Table I sets forth the mix formulation for Examples 1 and 2 and the pumping characteristics, and the sprayed physical properties after drying at 230° F. (Fahrenheit) and after heating at 1500° F. and 2730° F. for each Example, respectively.

TABLE I

| MIX FORMULATION: | EXAMPLE NUMBER 1 Wt. % | EXAMPLE NUMBER 2 Wt. % |
|---|---|---|
| Vitreous Silica | | |
| Mesh Size: +4/10 | 26.3 | 30 |
| −10/28 | 11.4 | 13 |
| −28/65 | 6.14 | 7 |
| GP-11 I Fused Silica Powder | 17.5 | 20 |
| Elkem EMS-965 | 6.14 | 7 |
| Min-U-Sil, 5 micron | 8.77 | 10 |
| Sil-Co-Sil 90 | 11.4 | 10 |
| Kasil SS Powder | — | 3 |
| Ludox 30 HS | 12.28 | — |
| Herculon Type 153 Fiber | 0.1 | 0.1 |

TABLE I-continued

| MIX FORMULATION: | EXAMPLE NUMBER 1 Wt. % | EXAMPLE NUMBER 2 Wt. % |
|---|---|---|
| Application Rate: | | |
| Refractory Composition Pump Feed Rate: | 200 lbs./minute | |
| Flocculant Pump Feed Rate: | 0.1 gallons/minute | |
| After Drying at 230° F. | | |
| Bulk Density, pcf | 110 | 108 |
| After Heating at 1500° F. | | |
| Bulk Density, pcf | 107 | 105 |
| After Heating at 2730° F. | | |
| Bulk Density, pcf | 109 | 108 |
| Modulus of Rupture, psi | | |
| After drying at 230° F. | 510 | 570 |
| After heating at 1500° F. | 340 | 270 |
| Cold Crushing Strength, psi | | |
| After drying at 230° F. | 2340 | 1920 |
| After heating at 1500° F. | 2360 | — |

The results set forth in Table I show that the high purity silica refractory compositions of the instant invention have very good bulk densities after drying at 230° F. and after heating at both 1500° F. and 2730° F. Similarly, the moduli of rupture and cold crushing strengths of each high purity silica refractory composition as set forth in Table I demonstrate the excellent physical characteristics of the present invention.

Example 1 sets forth a mix formulation of the instant invention that can be applied without forms. In Example 1, the flocculating agent was added at the time of installation in an amount sufficient to give a bulk density of 107 pcf (pounds per cubic foot, lbs./ft$^3$).

The purpose of the flocculating agent is to "over-power" or eliminate the effect of the dispersed constituents of the tempered pumpable first component of the sprayable refractory castable composition. The flocculating agent acts to turn the castable instantly into a stiff plastic mass, making it stiff enough at its existing water level to be sprayed onto a surface without slumping and without the need for forms. The flocculating agent reacts with the refractory castable composition causing it to agglomerate.

Generally, the method of this invention includes adding water in an amount sufficient to achieve a pumpable consistency suitable for use with pump means and the associated hose means and nozzle means utilized therewith. Pump means, hose means and nozzle means are conventional and well known by those skilled in the art. For example, the nozzle means may have a hook-up where air and flocculating agent are fed to the nozzle means in order to take the pumpable high purity silica refractory castable composition into a form such that it is sprayed onto a surface to be lined or repaired with the pumpable sprayable high purity silica refractory castable composition. If desired, the flocculating agent can be added by means of any conventional pump and a "Y" interconnect to the airline, so that the flocculating agent can be added at the proper rate directly to the high purity silica refractory castable composition at the nozzle.

As will be appreciated and known by those skilled in the art, another pump means for feeding the flocculating agent to the nozzle means or hose means must have the capacity to match the pump means for pumping the refractory castable composition at its given material output, and must be able to generate enough pressure to overcome the air pressure in the line, which is ordinarily about 50 to 100 psi (pounds per square inch).

With respect to the amount of water added in order to have a satisfactory tempered mix (i.e., that is to have an adequate pumpable consistency) the amount will vary, depending mainly upon the particular components in the mix, the particular pump means utilized, the length of hose means by which it is supplied, and the air pressure. These are all readily calculable by those persons skilled in this art. The amount of water added to properly temper the refractory castable composition to obtain a proper pump cast consistency, is such that it could be run through the pump means, and through about from 25 feet to 200 feet of hose means, and placed on a surface utilizing from about 80 psi (pounds per square inch) to 100 psi air pressure. In Example 1, no additional water was added since the binder was in the nature of a colloidal silica liquid.

In Example 1, an Allentown Power Creter Pro swing valve piston pump and a 500 psi diaphragm chemical pump to move the flocculating agent were used. A 350 cfm (cubic feet per minute) air compressor was used as the source of air feed and air was injected into the nozzle at 90 psi pressure. The sprayable high silica refractory castable composition of this invention was then tested by spraying the material onto a vertical surface panel, and then the sprayed panel is cut on a brick diamond saw into the desired test specimens after air curing.

Whereas particular embodiments of the instant invention have been described for the purposes of illustration, it will be evident to those persons skilled in the art that numerous variation and details of the instant invention may be made without departing from the instant invention as defined in the appended claims.

What is claimed is:

1. A refractory composition comprising from about 50.0 weight percent to 99.9 weight percent of a high purity silicon dioxide and from about 0.1 weight percent to about 30.0 weight percent of a binder, wherein said binder comprises potassium silicate, and from about 0.1 weight percent to 5.0 weight percent of a calcium carbonate.

2. The refractory composition of claim 1, wherein said high purity silicon dioxide is a material selected from the group consisting of amorphous silica, crystalline silica, fumed silica, quartz, and combinations thereof.

3. The refractory composition of claim 2 wherein said amorphous silica is a material selected from the group consisting of a fused silica, vitreous silica, and combinations thereof.

4. A refractory composition comprising from about 50.0 weight percent to 99.9 weight percent of a high purity silicon dioxide and from about 0.1 weight percent to about 30.0 weight percent of a binder, wherein said binder comprises potassium silicate, and from about 0.1 weight percent to 1.0 weight percent of at least one fiber.

5. A refractory castable composition comprising (a) one hundred weight percent of a refractory composition comprising from about 50.0 weight percent to 99.9 weight percent of a high purity silicon dioxide and from about 0.1 weight percent to 30.0 weight percent of a binder, wherein said binder is potassium silicate, (b) from about 0.1 weight percent to 30.0 weight percent water based upon one hundred weight percent of said refractory composition, wherein said water is present in an effective amount to achieve a castable consistency, and (c) from about 0.1 weight percent to 5.0 weight percent of a calcium carbonate.

6. The refractory castable composition of claim 5 wherein said high purity silicon dioxide is a material selected from the group consisting of amorphous silica, crystalline silica, fumed silica, quartz, and combinations thereof.

7. The refractory castable composition of claim 6 wherein said amorphous silica is a material selected from the group consisting of a fused silica, vitreous silica, and combinations thereof.

8. A refractory castable composition comprising (a) one hundred weight percent of a refractory composition comprising from about 50.0 weight percent to 99.9 weight percent of a high purity silicon dioxide and from about 0.1 weight percent to 30.0 weight percent of a binder, wherein said binder is potassium silicate, (b) from about 0.1 weight percent to 30.0 weight percent water based upon one hundred weight percent of said refractory composition, wherein said water is present in an effective amount to achieve a castable consistency, and (c) from about 0.1 weight percent to 1.0 weight percent of a fiber.

9. An essentially non-slumping, sprayable refractory castable composition that is applied without the use of forms comprising:
  (a) a tempered, pumpable first component comprising (i) 100 weight percent of a refractory composition, said refractory composition comprising from about 50.0 weight percent to 99.9 weight percent of a high purity silicon dioxide, and from about 0.1 weight percent to 30.0 weight percent of a binder, wherein said binder is a silica based material, and (ii) from about zero weight percent to thirty weight percent water based upon 100 weight percent of said refractory composition, wherein said water is in an amount sufficient to achieve a pumpable consistency, and wherein said tempered, pumpable first component excludes the addition of a calcium-aluminate cement; and
  (b) a second component comprising a flocculating agent, wherein said second component is added to said first component for achieving installation of said sprayable refractory castable composition in an amount to prevent slumping, wherein said flocculating agent is a material selected from the group consisting of an alkali chloride, an alkaline-earth chloride, an alkali phosphate, a calcium hydroxide, and a calcium oxide.

10. The sprayable refractory castable composition of claim 9 wherein said high purity silicon dioxide is a material selected from the group consisting of amorphous silica, crystalline silica, fumed silica, quartz, and combinations thereof.

11. The sprayable refractory castable composition of claim 10 wherein said amorphous silica is a material selected from the group consisting of a fused silica, vitreous silica, and combinations thereof.

12. The sprayable refractory castable composition of claim 9 wherein said refractory composition further comprises from about 0.1 weight percent to 5.0 weight percent of a calcium carbonate.

13. The sprayable refractory castable composition of claim 9 further comprising from about 0.1 weight percent to 1.0 weight percent of at least one fiber.

14. The sprayable refractory castable composition of claim 9 wherein said silica based material is selected from the group consisting of a colloidal silica, an alkali silicate, and combinations thereof.

15. The sprayable refractory castable composition of claim 14 wherein said alkali silicate is potassium silicate.

* * * * *